(12) United States Patent
Grannemann et al.

(10) Patent No.: US 7,726,666 B2
(45) Date of Patent: Jun. 1, 2010

(54) ACTUATOR FOR A DIVIDED STABILIZER OF A MOTOR VEHICLE

(75) Inventors: Bernd Grannemann, Espelkamp (DE); Andreas Hartmann, Höltinghausen (DE); Jens Vortmeyer, Oldendorf (DE); Mauro Zanella, Dielingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 426 days.

(21) Appl. No.: 11/909,128

(22) PCT Filed: Mar. 20, 2006

(86) PCT No.: PCT/DE2006/000494

§ 371 (c)(1),
(2), (4) Date: Sep. 19, 2007

(87) PCT Pub. No.: WO2006/099848

PCT Pub. Date: Sep. 28, 2006

(65) Prior Publication Data

US 2008/0191430 A1   Aug. 14, 2008

(30) Foreign Application Priority Data

Mar. 22, 2005   (DE) .................. 10 2005 013 769

(51) Int. Cl.
*B60G 21/055*   (2006.01)
(52) U.S. Cl. .................. 280/5.511; 280/124.107; 280/124.152; 267/188

(58) Field of Classification Search .............. 280/5.511, 280/124.152, 124.107, 5.502; 267/188, 191, 267/271, 186
See application file for complete search history.

(56) References Cited

U.S. PATENT DOCUMENTS

| 4,919,444 | A |   | 4/1990  | Leiber et al. |
| 5,575,502 | A | * | 11/1996 | Oppitz et al. ......... 280/124.166 |
| 5,580,079 | A | * | 12/1996 | Pradel et al. ......... 280/124.107 |
| 6,439,583 | B1 | * | 8/2002  | Markowetz ............. 280/5.511 |
| 6,513,819 | B1 | * | 2/2003  | Oliver et al. ......... 280/124.152 |

(Continued)

FOREIGN PATENT DOCUMENTS

DE   26 29 816 A1   1/1978

(Continued)

*Primary Examiner*—Paul N. Dickson
*Assistant Examiner*—Timothy Wilhelm
(74) *Attorney, Agent, or Firm*—McGlew and Tuttle, P.C.

(57) ABSTRACT

An actuator is provided for a two-part stabilizer, which builds up a spring rate in its opened position. A hydraulic absorbing unit (9) is arranged on the axle of the switchable coupling unit (8). The absorbing unit is connected to one stabilizer part (4), on the one hand, and to the other stabilizer part (5), on the other hand. The absorbing unit forms at least one pressure chamber (32) and a suction chamber (33) and assumes a blocked position in the locked position of the switchable coupling (8) and counteracts the relative twisting motion between the two stabilizer parts (4, 5) at a hydraulic spring rate in the opened position of the switchable coupling (8).

6 Claims, 2 Drawing Sheets

U.S. PATENT DOCUMENTS

| | | | |
|---|---|---|---|
| 6,951,341 B1 * | 10/2005 | Beetz et al. | 280/5.511 |
| 7,121,559 B2 * | 10/2006 | Ersoy et al. | 280/5.511 |
| 7,150,458 B2 * | 12/2006 | Reichel et al. | 280/5.511 |
| 7,204,494 B2 * | 4/2007 | Reichel et al. | 280/5.506 |
| 7,311,316 B2 * | 12/2007 | Yasui et al. | 280/5.511 |
| 2007/0108707 A1 * | 5/2007 | Kobayashi | 280/5.511 |
| 2008/0042377 A1 * | 2/2008 | Beetz et al. | 280/5.511 |

FOREIGN PATENT DOCUMENTS

| | | |
|---|---|---|
| DE | 197 54 539 A1 | 6/1999 |
| DE | 199 23 100 C1 | 2/2001 |
| DE | 100 12 915 A1 | 10/2001 |

* cited by examiner

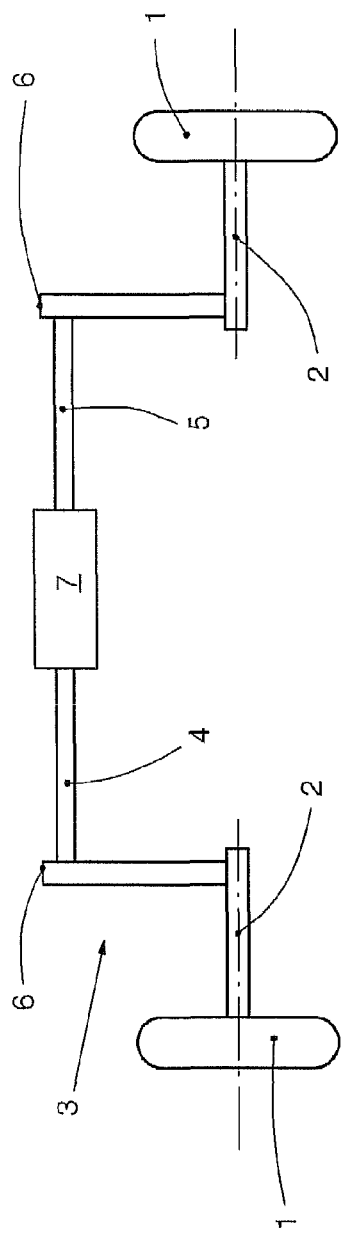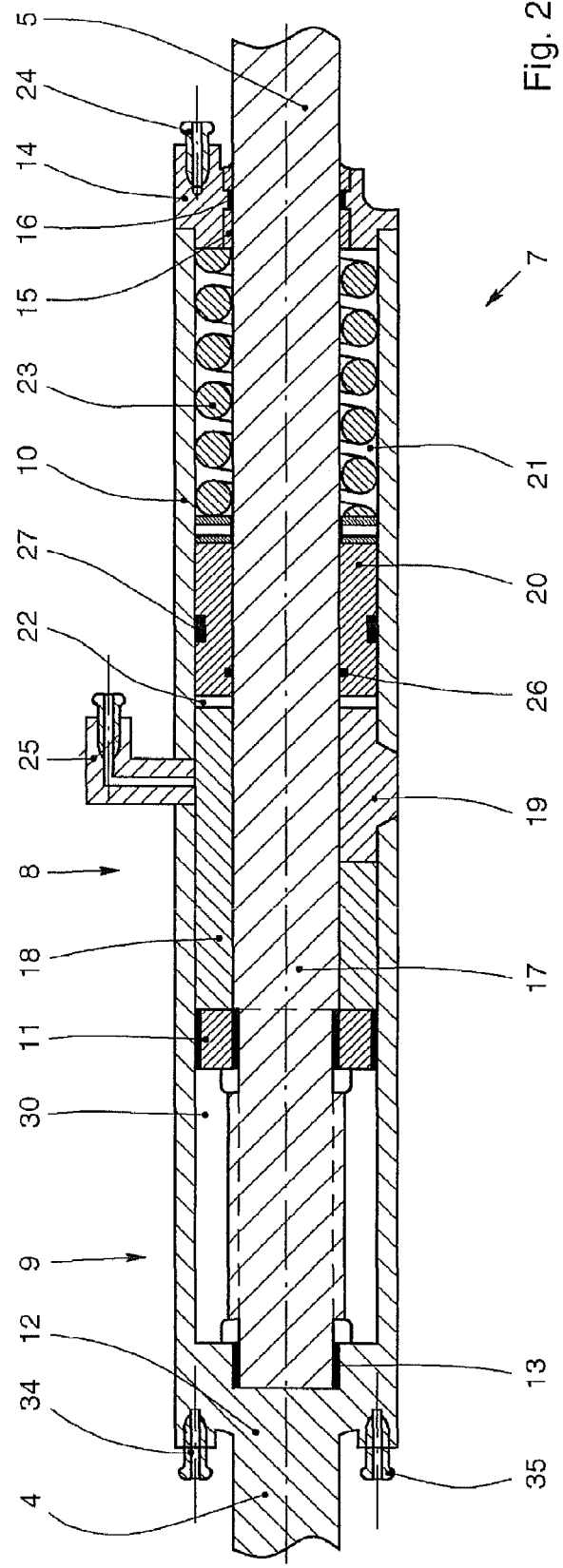

ACTUATOR FOR A DIVIDED STABILIZER OF A MOTOR VEHICLE

CROSS REFERENCE TO RELATED APPLICATIONS

This application is a United States National Phase application of International Application PCT/DE2006/000494 and claims the benefit of priority under 35 U.S.C. §119 of German Patent Application DE 10 2005 013 769.5 filed Mar. 22, 2005, the entire contents of which are incorporated herein by reference.

FIELD OF THE INVENTION

The present invention pertains to an actuator according to the preamble of claim 1. Such an actuator is also known as a labilizer and is used mainly in automotive engineering.

BACKGROUND OF THE INVENTION

A stabilizer, which operates according to the torsion bar principle, is arranged in parallel to the vehicle axle and is attached at both ends to a wheel suspension, is associated, in principle, with each axle of a motor vehicle. This stabilizer prevents or substantially weakens the transmission of the rolling motions caused by the road surface conditions and originating from the wheels to the vehicle body construction. Such rolling motions occur especially in road curves or under uneven road surface conditions.

One-part stabilizers are designed in terms of their dimensioning and the properties of their materials for a predetermined spring rate, so that they can absorb torsional forces and generate corresponding opposing forces of a certain order of magnitude only. However, they consequently respond to different loads either too softly or too hard, which has an unfavorable effect on driving smoothness. One-part stabilizers are therefore very well suited for use on the road. By contrast, they are not suitable in vehicles designed for off-road use because of the higher torsional loads.

Two-part stabilizers, which are connected to one another via a hydraulic swivel motor, are therefore used in case of higher torsional loads, as they occur, for example, during off-road travel and where the limited twisting angle of a one-part stabilizer is not sufficient any longer. Such a two-part stabilizer with a hydraulic swivel motor is described in DE 100 12 915 A1. This hydraulic swivel motor comprises an outer rotating part, which is rigidly connected to one stabilizer part, and an inner rotating part, which is in rigid connection with the other stabilizer part. The outer rotating part has inwardly directed stator wings and the inner rotating part has outwardly directed rotor wings, the stator wings and the rotor wings forming hydraulic pressure chambers and hydraulic suction chambers between them. The inner rotating part and the outer rotating part are rotatable within these pressure and suction chambers in relation to one another to a limited extent up to the stops of the stator wing and the rotor wing. The hydraulic swivel motor thus permits an additional twisting angle, as a result of which the two-part stabilizer can respond to greater unevennesses of the road surface. In addition, the hydraulic swivel motor with its hydraulic spring rate responds more softly to unevennesses of the road surfaces, as a result of which the driving smoothness increases further. Two-part stabilizers with a hydraulic swivel motor are therefore used off-road because of the greater twisting angle and on road because of the better driving smoothness.

Divided stabilizers, which are connected to one another via a switchable coupling, are used especially in vehicles that are intended for both road and off-road use and are therefore exposed to greatly varying torsional loads. Such a switchable coupling is likewise described in the above-mentioned DE 100 12 915 A1. This switchable coupling also comprises an outer rotating part and an inner rotating part, which are rigidly connected to one stabilizer part, on the one hand, and to the other stabilizer part, on the other hand. The outer rotating part and the inner rotating part are equipped with two opposite carriers each, which are arranged on a common radial plane and which form two opposite free spaces between them. Furthermore, an axially displaceable locking piston, which has locking elements fitting the intermediate spaces of the carriers on the front side and which is loaded by a compression spring in the locking direction and by a hydraulic pressure in the unlocking direction, is guided in the coupling. The hydraulic pressure in the hydraulic coupling is switched off for, e.g., road travel, so that the locking piston is displaced under the force of the compression spring and fills out the free spaces between the carriers of the two rotating parts with its locking elements without clearance. The two stabilizer parts are thus connected to one another in such a way that they rotate in unison and the two stabilizer parts thus behave as a one-part stabilizer in this position. The locking piston is loaded by a hydraulic pressure for, e.g., off-road travel; this pressure displaces the locking piston against the force of the compression spring and thus opens the locking elements and the radial carriers. The outer rotating part and the inner rotating part are rotatable in relation to one another over a limited twisting angle in this open position.

However, such a switchable coupling also has drawbacks. Thus, different spring rates act over the entire available twist angle of the stabilizer. When the coupling is locked, the spring rates of the stabilizer parts act in both twisting directions and when the coupling is unlocked, the spring rates of the stabilizer parts act only in the twisting direction in which the two carriers of the two rotating parts are in contact with one another. By contrast, there are no forces that would oppose the loads originating from the unevennesses of the road surface in the open position of the hydraulic coupling and between the two contact positions of the two carriers in one twisting direction and in the other twisting direction. The rolling motions occurring in this range of action are consequently transmitted practically without absorption to the vehicle body construction. This considerably reduces the driving smoothness.

SUMMARY OF THE INVENTION

The basic object of the present invention is therefore to provide an actuator of this type for the stabilizer of a motor vehicle, which also builds up a spring rate in the opened position of the stabilizer.

According to the invention, an actuator for a divided stabilizer of a motor vehicle is provided including a switchable coupling unit with an outer rotating part, which is connected, on the one hand, to a stabilizer part in such a way that they rotate in unison, and with an inner rotating part, which is connected, on the other hand, to another stabilizer part in such a way that they rotate in unison. The switchable coupling unit has a locking piston, which locks the outer rotating part and the inner rotating part in one position in such a way that they rotate in unison and opens them for a predetermined radial path of twisting in another position. A hydraulic absorbing unit is arranged on the axle of the switchable coupling unit. The absorbing unit is connected to one stabilizer part on the one hand, and to the other stabilizer part on the other hand. The absorbing unit forms at least one pressure chamber and a suction chamber. The absorbing unit assumes a blocked position in the locked position of the switchable coupling and opposes the relative twisting motion between the two stabilizer parts, at a hydraulic spring rate, in the opened position of the switchable coupling (8).

The special advantage of the actuator is that an intended spring rate can also be set in the open position of the switchable coupling in the case of a two-part stabilizer. A spring rate acts over the entire path of twisting of the stabilizer with the hydraulic spring rate generated by the hydraulic absorbing unit and acting in the open position and with the spring rate of the two coupled stabilizer parts. As a result, there are a great driving smoothness and high driving safety both for road travel and for off-road travel.

It is advantageous according to the invention that the pressure in the pressure chambers of the hydraulic swivel motor can be controlled and selected to be such that the hydraulic spring rate adapts itself to the spring rate of the stabilizer parts.

It is also advantageous if the switchable coupling unit and the hydraulic absorbing unit form a common housing and a common shaft. This simplifies the design of the actuator, which leads to a simpler and hence less expensive manufacture. However, this simple design also leads to a compact design, as a result of which the actuator can be installed in the motor vehicle in a very compact manner. However, it is also possible, in principle, to build the switchable coupling and the hydraulic absorbing unit as separate assembly units, which are functionally linked with one another and are positioned in fitting positions of the stabilizer.

The present invention shall be explained in more detail on the basis of an exemplary embodiment. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiments of the invention is illustrated.

BRIEF DESCRIPTION OF THE DRAWINGS

In the drawings:

FIG. 1 is a simplified view of a two-part stabilizer with an actuator in the installed state;

FIG. 2 is a longitudinal sectional view of the actuator;

DESCRIPTION OF THE PREFERRED EMBODIMENT

Figure 3:
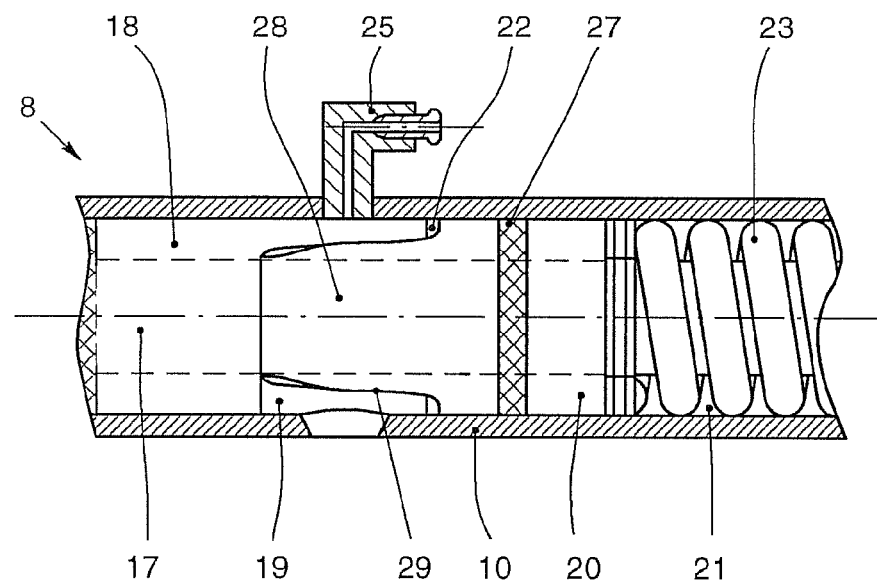
FIG. 3 is a longitudinal sectional view of the coupling unit of the actuator.

Referring to the drawings in particular, according to FIG. 1, each axle of a motor vehicle comprises, in principle, two wheels 1, which are attached to an axle 2. A divided stabilizer 3 with its two stabilizer parts 4 and 5 is located in parallel to the axle 2, each stabilizer part 4, 5 being connected, on the one hand, to a wheel suspension of the corresponding wheel 1, which wheel suspension is not shown, and, on the other hand, to the vehicle body construction via a mounting point 6. An actuator 7, which connects the two stabilizer parts 4, 5 of the stabilizer 3 to one another or separates them from one another, is arranged between the two stabilizer parts 4 and 5.

As is shown in FIG. 2, the actuator 7 is composed of a switchable coupling unit 8 and a hydraulic absorbing unit 9, which are both accommodated on the same axle in a common cylindrical housing 10 and which are separated from one another by a bearing and sealing element 11 in a pressure-sealed manner. The cylindrical housing 10 has a closed bottom 12, which is connected to one stabilizer part 4 in a non-positive manner. A mounting point 13 for a hinge is located on the inner side of the bottom 12. Opposite the bottom 12, the housing 11 is closed with a cover 14 in such a way that they rotate in unison. The cover 14 has a continuous bearing hole 15 and is equipped with a corresponding sealing element 16 for a shaft 17. The shaft 17 is connected to the other stabilizer part 5 in a non-positive manner and extends through the entire cylindrical housing 10 up to the mounting point 13 in the bottom 12 of the cylindrical housing 10. The shaft 17 thus covers both the switchable coupling unit 8 and the hydraulic absorbing unit 9.

As is shown in FIG. 3, the shaft 17 is connected to a radial carrier 18 in a positive-locking and non-positive manner within the switchable coupling unit 8, the radial carrier 18 being arranged in the radial space between the shaft 17 and the inner wall of the cylindrical housing 10. The connection between the shaft 17 and the radial carrier 18 is preferably embodied by teeth.

Another radial carrier 19 is connected to the housing 10 in such a way that they rotate in unison and is arranged in the same radial plane as the radial carrier 18 of the shaft 17 and likewise in the radial space between the shaft 17 and the inner wall of the cylindrical housing 10. The radial carrier 18 of the shaft 17 and the radial carrier 19 of the cylindrical housing 10 are dimensioned such that they form corresponding free spaces between them and thus are rotated in relation to one another to a limited extent only.

Furthermore, an axially displaceable and rotatable locking piston 20, which divides the inner chamber of the cylindrical housing 10 into a compression spring chamber 21 on the cover side and a pressure chamber 22 on the bottom side, is located on the shaft 17 and in the axial vicinity of the radial carriers 18, 19. A compression spring 23, which is supported at the cover 14 of the housing 10 and loads the locking piston 20, is inserted into the compression spring chamber 21. The compression spring chamber 21 is connected, furthermore, to a hydraulic tank, not shown, via an overflow oil connection. By contrast, the pressure chamber 22 has a connection via a pressure oil connection 25 to a hydraulic pressure oil supply unit, not shown. The locking piston 20 is equipped, furthermore, with an inner sealing element 26 and with an outer sealing element 27, which hydraulically seal the pressure chamber 22 and the compression spring chamber 21 against each other.

As is shown especially in FIG. 3, two locking claws 28, which are located, in the same manner as the two radial carriers 18 and 19, in the radial free space between the shaft 17 and the wall of the housing 10 and are both arranged opposite each other, are formed on the bottom side of the locking piston 20. The shape and the dimensions of the two locking pistons 28 are coordinated in a special manner with the shapes and dimensions of the two radial carriers 18 and 19. Thus, the two locking claws 28 have a width that fills the two free spaces between the two radial carriers 18 and 19 without clearance and a length that makes possible for the locking claws 28 to mesh with the area of the two radial carriers 18, 19 in one end position of the adjusting piston 20. Furthermore, the locking piston 20 is equipped with a stroke limitation, which prevents the two radial carriers 18, 19 and the two locking claws 28 from becoming disengaged in the other end position of the adjusting piston 20. Consequently, there continues to be a positive longitudinal overlap between the radial carriers 18, 19 and the locking claws 28 of the locking piston 20 in this end position.

The contact surfaces of the two carriers 18, 19 and of the two locking claws 28, which contact surfaces are located opposite each other and communicate with one another, are of the same design with conical surfaces 29, so that a clearance-free connection is obtained in the locked end position of the locking piston 20, which end position is shown in the figure, and a radial space becomes established between the locking claws 8 and the radial carriers 18, 19 in the opened and axially limited end position of the locking piston 20.

Figure 4:
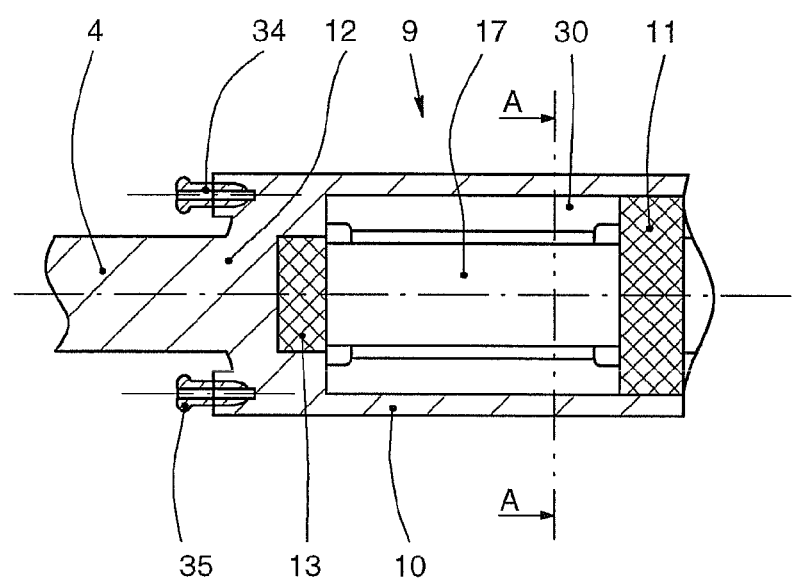
FIG. 4 is a longitudinal sectional view of an absorbing unit of the actuator.
Figure 5:
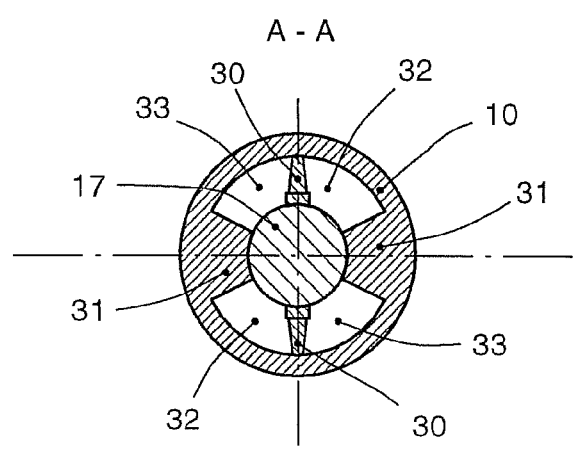
FIG. 5 is a cross sectional view of the absorbing unit of the actuator.

According to FIGS. 2, 4 and 5, the shaft 17 is equipped with inner, radially outwardly directed rotor wings 30 in the area of the hydraulic absorbing unit 9, while the cylindrical housing 10 has corresponding outer, radially inwardly directed rotor wings 31. The inner rotor wings 30 of shaft 17 and the outer rotor wings 31 of the cylindrical housing 10 are made over an equal axial length and with such a shape that they form at least two radial free spaces between them. The outer rotor wings 31 and the inner rotor wings 30 are freely rotatable against each other in the area of these free spaces until they come into contact with a mutual stop. The radial free spaces between the inner rotor wings 30 and the outer rotor wing 31 are closed axially by the bottom 12, on the one hand, and by the bearing and sealing element 11, on the other hand, so that the free spaces between the inner rotor wings 30 and the outer rotor wings 31 are formed as two opposite pressure chambers 32 and suction chambers 33. All pressure chambers 32 are connected to one another by a first pressure equalization channel, not shown, and all suction chambers 33 are connected to one another by a second pressure equalization channel, not shown. Via a pressure oil connection 34 and a suction oil connection 35, both the pressure chambers 32 and the suction chambers 33 are connected to a hydraulic unit, which has means for supplying and removing pressure oil and for controlling and regulating the pressures in the pressure chambers 32 and in the suction chambers 33.

Under normal road surface conditions, as they occur, e.g., in road traffic, the pressure chamber 22 is maintained in a pressureless state, so that the locking piston 20 is loaded by the force of the compression spring 23 only. As a result, the locking piston 20 is displaced in the direction of the two radial carriers 18, 19 until the conical surfaces 29 of the radial carriers 18, 19 and the conical surfaces 29 of the locking claws 28 come into contact with one another. The coupling unit 8 is thus locked in a non-positive and positive-locking manner. The rotary motions of the inner rotor wings 30 of the shaft 17 and the outer rotor wings 31 of the cylindrical housing 10 are blocked at the same time with this locking, so that the function of the hydraulic absorbing unit 9 is stopped. The stabilizer parts 4, 5 thus coupled will then behave as a one-part stabilizer. The rolling motions originating from the wheels 1 are compensated by the designed spring rate of the two stabilizer parts 4 and 5 alone.

Under abnormal road surface conditions, as they occur, e.g., off the road, the pressure chamber 22 of the locking piston 20 is supplied with a necessary pressure, which displaces the locking piston 20 against the force of the compression spring 23 in the direction of the cover 14 of the cylindrical housing 10. This motion of the locking piston 20 is axially limited, so that the conical surfaces 29 of the radial carriers 18, 10 and the conical surfaces 29 of the locking claws 28 become disengaged, but a longitudinal overlap of the radial carriers 18, 19, on the one hand, and of the locking claws 28, on the other hand, is nevertheless preserved. The radial carriers 18 and 19 and hence the two stabilizer parts 4 and 5 are rotatable in relation to one another in this position to a limited extent until the conical surfaces 29 of the radial carriers 18, 19, on the one hand, and of the locking claws 28, on the other hand, will again come into contact with one another. If the radial carriers 18, 19 and the locking claws are in contact for one of the two twisting directions, the two stabilizer parts 4, 5 act again, in this twisting direction, as a one-part stabilizer, which again compensates the rolling motion of the wheels 1 on the basis of the designed spring rate of the stabilizer parts 4, 5 in the corresponding direction. In case of a change in direction of the twisting of the stabilizer parts 4 and 5, the contact between the conical surfaces 29 of the radial carriers 18, 19 and of the locking claws 28 is eliminated, on the one hand, to come closer to one another, on the other hand. This twisting motion between the two contact positions equally takes place in the hydraulic absorbing unit 9, so that the inner rotor wings 30 of the shaft 17 and the outer rotor wings 31 of the cylindrical housing 10 move relative to one another and reduce the size of the pressure chambers 32 to the extent to which the size of the suction chambers 33 increases. The forces that arise from the prevailing pressure in the pressure chambers 32 oppose this twisting motion. The twisting motion is thus absorbed over this twisting angle as a function of the prevailing pressure in the pressure chambers 32, so that the rolling motions originating from the wheels 1 are spring-cushioned in this range of twisting at a hydraulic spring rate predetermined by a setting of the hydraulic pressure in the pressure chambers 32. A hydraulic spring rate that corresponds to the spring rate of the two stabilizer parts 4 and 5 can be ideally generated for this range of twisting by correspondingly selecting the pressure.

While specific embodiments of the invention have been shown and described in detail to illustrate the application of the principles of the invention, it will be understood that the invention may be embodied otherwise without departing from such principles.

LIST OF REFERENCE NUMBERS

1 Wheel
2 Axle
3 Stabilizer
4 Stabilizer part
5 Stabilizer part
6 Mounting point
7 Actuator
8 Switchable coupling unit
9 Hydraulic absorbing unit
10 Cylindrical housing
11 Bearing and sealing element
12 Bottom
13 Mounting point
14 Cover
15 Bearing hole
16 Sealing elements
17 Shaft
18 Radial carrier
19 Radial carrier
20 Locking piston
21 Compression spring chamber
22 Pressure chamber
23 Compression spring
24 Overflow oil connection
25 Pressure oil connection 26 Inner sealing element
27 Outer sealing element
28 Locking claw
29 Conical surface
30 Inner rotor wing
31 Outer rotor wing
32 Pressure chamber
33 Suction chamber
34 Pressure oil connection
35 Suction oil connection

The invention claimed is:

1. An actuator for a divided stabilizer of a motor vehicle, the actuator comprising:
   a switchable coupling unit with an outer rotating part connected to a stabilizer part in such a way that the outer rotating part and the stabilizer part rotate in unison, and with an inner rotating part connected to another stabilizer part in such a way that the inner rotating part and the another stabilizer part rotate in unison, and with a locking piston locking said outer rotating part and said inner rotating part in a locked position in such a way that said outer rotating part and said inner rotating part rotate in unison and unlocking said outer rotating part and said inner rotating part for a predetermined radial path of twisting in an opened position; and
   a hydraulic absorbing unit arranged on the axle of said switchable coupling unit, said absorbing unit being connected to said stabilizer part and to said another stabilizer part, said absorbing unit forming at least one pressure chamber and a suction chamber said absorbing unit assuming a blocked position in the locked position of said switchable coupling and said absorbing unit opposing the relative twisting motion between said two stabilizer parts at a hydraulic spring rate in the opened position of said switchable coupling.

2. An actuator in accordance with claim 1, further comprising a hydraulic pressure supply with a control means the pressure in said pressure chamber of said hydraulic absorbing unit being controllable to change the hydraulic spring rate via said control means of the hydraulic pressure supply unit.

3. An actuator in accordance with claim 1, wherein said switchable coupling unit and said hydraulic absorbing unit are embodied with a common cylindrical housing and with a common shaft.

4. A motor vehicle stabilizer comprising:
   a first stabilizer part
   a second stabilizer part
   a switchable coupling unit with an outer rotating part connected to said first stabilizer part, said outer rotating part and said first stabilizer part rotating in unison, and with an inner rotating part connected to said second stabilizer part, said inner rotating part and the second stabilizer part rotating in unison, and with a locking piston locking said outer rotating part and said inner rotating part in a locked position such that said outer rotating part and said inner rotating part rotate in unison and unlocking said outer rotating part and said inner rotating part for a predetermined radial path of twisting in an opened position;
   a hydraulic absorbing unit arranged on the axle of said switchable coupling unit, said absorbing unit being connected to said first stabilizer part and to said second stabilizer part, said absorbing unit having at least one pressure chamber and a suction chamber, said absorbing unit assuming a blocked position in the locked position of said switchable coupling and said absorbing unit opposing the relative twisting motion between said two stabilizer parts, at a hydraulic spring rate, in the opened position of said switchable coupling.

5. A motor vehicle stabilizer in accordance with claim 1, further comprising a hydraulic pressure supply with a control means the pressure in said pressure chamber of said hydraulic absorbing unit being controllable to change the hydraulic spring rate via said control means of the hydraulic pressure supply unit.

6. A motor vehicle stabilizer in accordance with claim 1, wherein said switchable coupling unit and said hydraulic absorbing unit are embodied with a common cylindrical housing and with a common shaft.

* * * * *